(12) United States Patent
Chen et al.

(10) Patent No.: US 6,807,157 B2
(45) Date of Patent: Oct. 19, 2004

(54) METHOD AND APPARATUS FOR COHERENT DEMODULATION IN COMMUNICATION SYSTEM EMPLOYING A POTENTIALLY GATED PILOT SIGNAL

(75) Inventors: Tao Chen, San Diego, CA (US); Yu-Chuan Lin, Encinitas, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 10/441,592

(22) Filed: May 19, 2003

(65) Prior Publication Data

US 2003/0210757 A1 Nov. 13, 2003

Related U.S. Application Data

(63) Continuation of application No. 09/372,726, filed on Aug. 12, 1999, now Pat. No. 6,594,286.

(51) Int. Cl.[7] .................................................. H04J 1/16
(52) U.S. Cl. ........................ 370/252; 370/503; 375/344
(58) Field of Search ................................. 370/529, 335, 370/252, 503; 375/326, 344, 322, 120, 13, 295; 342/62; 327/553; 455/12.1, 260; 179/15

(56) References Cited

U.S. PATENT DOCUMENTS

| | | | | |
|---|---|---|---|---|
| 5,281,973 A | * | 1/1994 | Murphy, Jr. et al. | 342/62 |
| 5,696,797 A | * | 12/1997 | Bucher et al. | 375/344 |
| 6,023,491 A | * | 2/2000 | Saka et al. | 375/326 |

* cited by examiner

Primary Examiner—John Pezzlo
(74) Attorney, Agent, or Firm—Philip R. Wadsworth; Thien T. Nguyen; Dean J. Tricarico

(57) ABSTRACT

The present invention is a novel and improved method and system for performing the pilot frequency tracking operation for coherent demodulation in a system employing a gated pilot signal. In particular, the present invention describes a method and apparatus in which two frequency tracking loops operate in parallel. The first frequency tracking loop performs its tracking operation based on the hypothesis that the received pilot is continuous throughout the frame's duration. The second frequency tracking loop performs the tracking operation based on the hypothesis that the received pilot is discontinuous and is only present for a portion of the frame's duration.

20 Claims, 8 Drawing Sheets

METHOD AND APPARATUS FOR COHERENT DEMODULATION IN COMMUNICATION SYSTEM EMPLOYING A POTENTIALLY GATED PILOT SIGNAL

CLAIM OF PRIORITY UNDER 35 U.S.C. §120

The present Application for Patent is a Continuation and claims priority to patent application Ser. No. 09/372,726 entitled "Method and Apparatus for Coherent Demodulation in Communication System Employing a Potentially Gated Pilot Signal," filed Aug. 12, 1999, now U.S. Pat. No. 6,594,286 and assigned to the assignee hereof and hereby expressly incorporated by reference herein.

BACKGROUND OF THE INVENTION

I. Field

The present invention relates to communications. More particularly, the present invention relates to a novel and improved method and apparatus for coherent demodulation in a wireless communication system.

II. Background

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation techniques of CDMA have significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in U.S. Pat. No. 5,414,796, entitled "VARIABLE RATE VOCODER", assigned to the assignee of the present invention and incorporated by reference herein.

The use of a variable rate speech encoder provides for data frames of maximum speech data capacity when the speech encoder is providing speech data at a maximum rate. When the variable rate speech encoder is providing speech data at a less than maximum rate, there is excess capacity in the transmission frames. A method for transmitting additional data in transmission frames of a fixed predetermined size, wherein the source of the data for the data frames is providing the data at a variable rate, is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In the above mentioned patent application a method and apparatus is disclosed for combining data of differing types from different sources in a data frame for transmission.

In frames containing less data than a predetermined capacity, power consumption may be lessened by transmission gating a transmission amplifier such that only parts of the frame containing data are transmitted. Furthermore, message collisions in a communication system may be reduced if the data is placed into frames in accordance with a predetermined pseudorandom process. A method and apparatus for gating the transmission and for positioning the data in the frames is disclosed in U.S. Pat. No. 5,659,569, entitled "DATA BURST RANDOMIZER", assigned to the assignee of the present invention and incorporated by reference herein.

A useful method of power control of a mobile in a communication system is to monitor the power of the received signal from the wireless communication device at a base station. In response to the monitored power level, the base station transmits power control bits to the wireless communication device at regular intervals. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention and incorporated by reference herein.

Within a coherent demodulator, is a channel estimate generator (not shown), which estimates the channel characteristics based on a transmitted signal with values known to both the transmitter and the receiver, referred to herein as the pilot signal. The pilot signal is demodulated and the phase ambiguities in the received signal are resolved by taking the dot product of the received signal and the pilot signal channel estimate. A description of a circuit for employing a pilot signal to resolve phase ambiguities is disclosed in U.S. Pat. No. 5,506,865, entitled "PILOT CARRIER DOT PRODUCT CIRCUIT", assigned to the assignee of the present invention, the disclosure of which is incorporated by reference herein.

There has been an increasing demand for wireless communications systems to be able to transmit digital information at high rates. One method for sending high rate digital data from a wireless communication device to a central base station is to allow the wireless communication device to send the data using spread spectrum techniques of CDMA. One method that is proposed is to allow the wireless communication device to transmit its information using a small set of orthogonal channels. Such a method is described in detail in co-pending U.S. patent application Ser. No. 08/886,604, now U.S. Pat. No. 6,396,804, entitled "HIGH DATA RATE CDMA WIRELESS COMMUNICATION SYSTEM" (hereafter the '604 application), assigned to the assignee of the present invention and incorporated by reference herein.

In the '604 application, a system is disclosed in which a pilot signal is transmitted on the reverse link (the link from the wireless communication device to the base station) to enable coherent demodulation of the reverse link signal at the base station. Using the pilot signal data, coherent processing can be performed at the base station by determining and removing the phase offset of the reverse link signal. Also, the pilot data can be used to optimally weigh multipath signals received with different time delays before being combined in a RAKE receiver. Once the phase offset is removed, and the multipath signals are properly weighted, the multipath signals can be combined to decrease the power at which the reverse link signal must be received for proper processing. This decrease in the required receive power allows greater transmission rates to be processed successfully, or conversely, the interference between a set of reverse link signals to be decreased.

While some additional transmit power is necessary for the transmission of the pilot signal, in the context of higher transmission rates the ratio of pilot signal power to the total reverse link signal power is substantially lower than that associated with lower data rate digital voice data transmission cellular systems. Thus, within a high data rate CDMA system, the $E_b/N_0$ gains achieved by the use of a coherent reverse link outweigh the additional power necessary to transmit pilot data from each wireless communication device.

However, when the data rate is relatively low, a continuously-transmitted pilot signal on the reverse link contains more energy relative to the data signal. At these low rates, the benefits of coherent demodulation and reduced interference provided by a continuously-transmitted reverse link pilot signal may be outweighed by the decrease in talk time and system capacity in some applications.

SUMMARY OF THE INVENTION

The present invention is a novel and improved method and system for performing the pilot frequency tracking operation for coherent demodulation in a system employing a gated pilot signal. In particular, the present invention describes a method and apparatus in which two frequency tracking loops operate in parallel. The first frequency tracking loop performs its tracking operation based on the hypothesis that the received pilot is continuous throughout the frame's duration. The second frequency tracking loop performs the tracking operation based on the hypothesis that the received pilot is discontinuous and is only present for a portion of the frame's duration.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
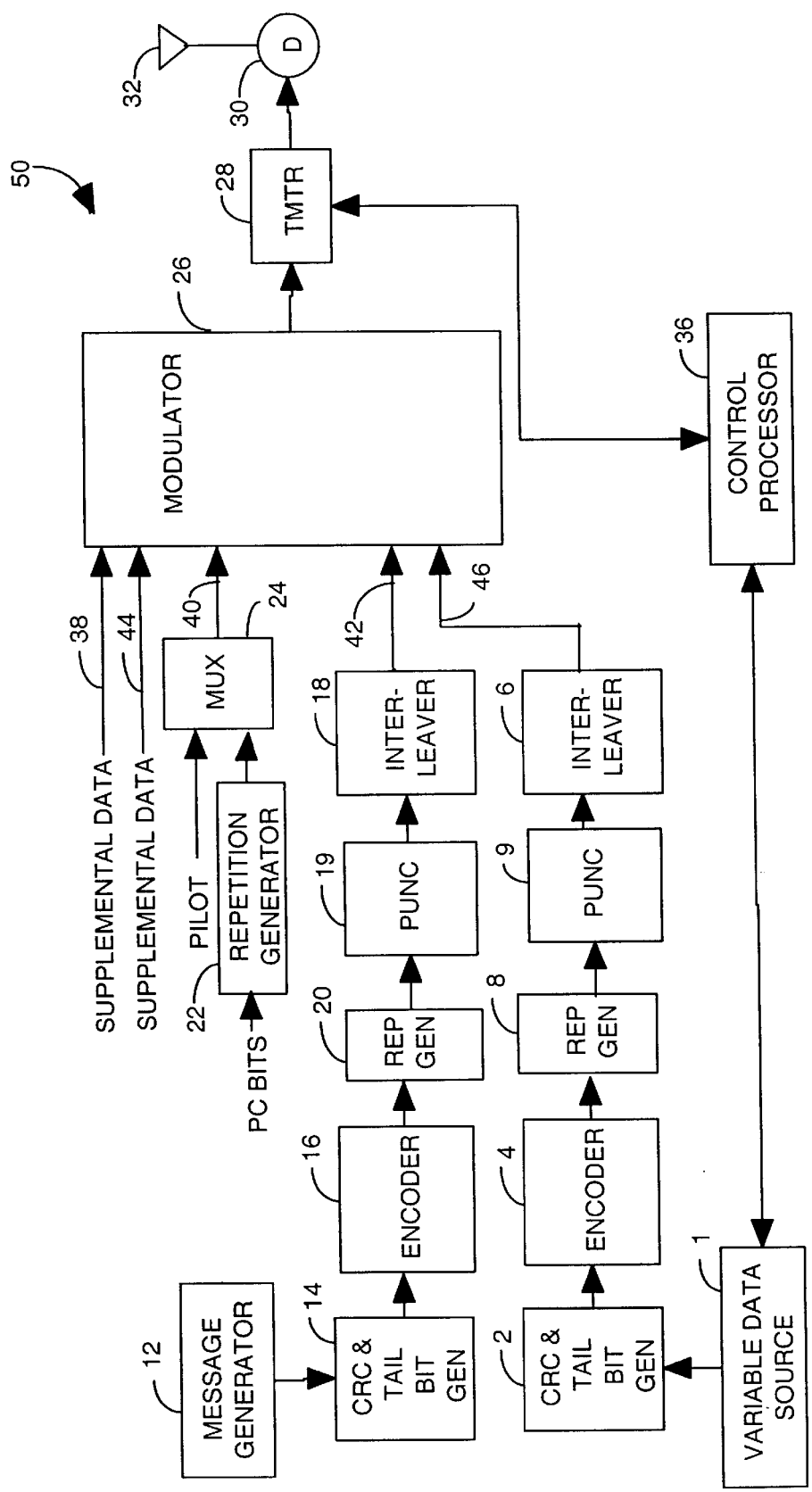
FIG. 1 is a functional block diagram of an exemplary embodiment of the transmission system of the present invention embodied in wireless communication device 50.

FIG. 1 illustrates a functional block diagram of an exemplary embodiment of the transmission system of the present invention embodied in wireless communication device 50. It will be understood by one skilled in the art that the methods described herein could be applied to transmission from a central base station (not shown) as well. It will also be understood that various of the functional blocks shown in FIG. 1 may not be present in other embodiments of the present invention. The functional block diagram of FIG. 1 corresponds to an embodiment that is useful for operation according to the TIA/EIA Standard IS-95C, also referred to as IS-2000. Other embodiments of the present invention are useful for other standards including Wideband CDMA (WCDMA) standards as proposed by the standards bodies ETSI and ARIB. It will be understood by one skilled in the art that owing to the extensive similarity between the reverse link modulation in the WCDMA standards and the reverse link modulation in the IS-95C standard, extension of the present invention to the WCDMA standards is easily accomplished.

In the exemplary embodiment of FIG. 1, the wireless communication device transmits a plurality of distinct channels of information which are distinguished from one another by short orthogonal spreading sequences as described in the aforementioned U.S. patent application Ser. No. 08/886,604, now U.S. Pat. No. 6,396,804. Five separate code channels are transmitted by the wireless communication device: 1) a first supplemental data channel 38, 2) a time multiplexed channel of pilot and power control symbols 40, 3) a dedicated control channel 42, 4) a second supplemental data channel 44 and 5) a fundamental channel 46. The first supplemental data channel 38 and second supplemental data channel 44 carry digital data which exceeds the capacity of the fundamental channel 46 such as facsimile, multimedia applications, video, electronic mail messages or other forms of digital data. The multiplexed channel of pilot and power control symbols 40 carries pilots symbols to allow for coherent demodulation of the data channels by the base station and power control bits to control the energy of transmissions of the base station or base stations in communication with wireless communication device 50. Control channel 42 carries control information to the base station such as modes of operation of wireless communication device 50, capabilities of wireless communication device 50 and other necessary signaling information. Fundamental channel 46 is the channel used to carry primary information from the wireless communication device to the base station. In the case of speech transmissions, the fundamental channel 46 carries the speech data.

Supplemental data channels 38 and 44 are encoded and processed for transmission by means not shown and provided to modulator 26. Power control bits are provided to repetition generator 22 which provides repetition of the power control bits before providing the bits to multiplexer (MUX) 24. In multiplexer 24 the redundant power control bits are time multiplexed with pilot symbols and provided on line 40 to modulator 26.

Message generator 12 generates necessary control information messages and provides the control message to CRC and tail bit generator 14. CRC and tail bit generator 14 appends a set of cyclic redundancy check bits which are parity bits used to check the accuracy of the decoding at the base station and appends a predetermined set of tail bits to the control message to clear the memory of the decoder at the base station receiver subsystem. The message is then provided to encoder 16 which provides forward error correction coding upon the control message. The encoded symbols are provided to repetition generator 20 which repeats the encoded symbols to provide additional time diversity in the transmission. Following repetition generator 20 certain symbols are punctured according to some predetermined puncturing pattern by puncturing element (PUNC) 19 to provide a predetermined number of symbols within the frame. The symbols are then provided to interleaver 18 which reorders the symbols in accordance with a predetermined interleaving format. The interleaved symbols are provided on line 42 to modulator 26.

Variable rate data source 1 generates variable rate data. In the exemplary embodiment, variable rate data source 1 is a variable rate speech encoder such as described in aforementioned U.S. Pat. No. 5,414,796. Variable rate speech encoders are popular in wireless communications because their use increases the battery life of wireless communication devices and increases system capacity with minimal impact on perceived speech quality. The Telecommunications Industry Association has codified the most popular variable rate speech encoders in such standards as Interim Standard IS-96 and Interim Standard IS-733. These variable rate speech encoders encode the speech signal at four possible rates referred to as full rate, half rate, quarter rate or eighth rate according to the level of voice activity. The rate indicates the number of bits used to encode a frame of speech and varies on a frame by frame basis. Full rate uses a predetermined maximum number of bits to encode the frame, half rate uses half the predetermined maximum number of bits to encode the frame, quarter rate uses one quarter the predetermined maximum number of bits to encode the frame and eighth rate uses one eighth the predetermined maximum number of bits to encode the frame.

Variable rate date source 1 provides the encoded speech frame to CRC and tail bit generator 2. CRC and tail bit generator 2 appends a set of cyclic redundancy check bits which are parity bits used to check the accuracy of the decoding at the base station and appends a predetermined set of tail bits to the control message in order to clear the memory of the decoder at the base station. The frame is then provided to encoder 4, which provides forward error correction coding on the speech frame. The encoded symbols are provided to repetition generator 8 which provides repetition of the encoded symbol. Following repetition generator certain symbols are punctured by puncturing element 9 according to a predetermined puncturing pattern to provide a predetermined number of symbols within the frame. The symbols are then provided to interleaver 6 which reorders the symbols in accordance with a predetermined interleaving format. The interleaved symbols are provided on line 46 to modulator 26.

In the exemplary embodiment, modulator 26 modulates the data channels in accordance with a code division multiple access modulation format and provides the modulated information to transmitter (TMTR) 28, which amplifies and filters the signal and provides the signal through duplexer 30 for transmission through antenna 32.

In the exemplary embodiment, variable rate data source 1 sends a signal indicative to the rate of the encoded frame to control processor 36. In response to the rate indication, control processor 36 provides control signals to transmitter 28 indicating the energy of the transmissions.

In IS-95 and cdma2000 systems, a 20 ms frame is divided into sixteen sets of equal numbers of symbols, referred to as power control groups. The reference to power control is based on the fact that for each power control group, the base station receiving the frame issues a power control command in response to a determination of the sufficiency of the received reverse link signal at the base station.

Figure 3A:
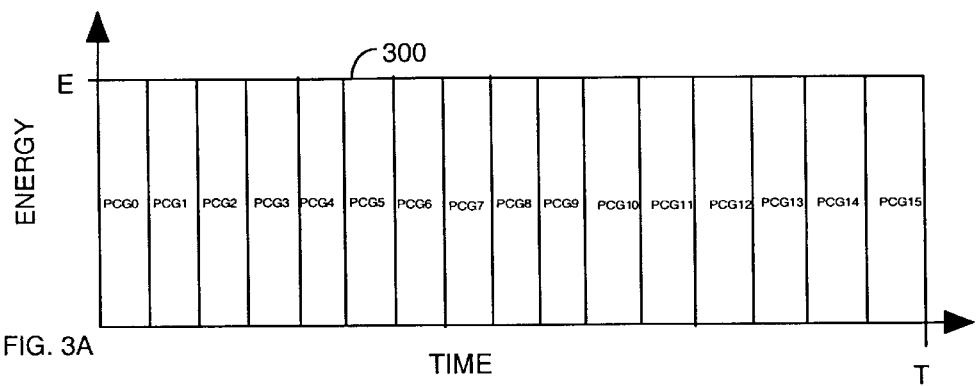
FIGS. 3A–3D illustrate the energy used to transmit the variable rate frames for four different data rates.
Figure 3B:
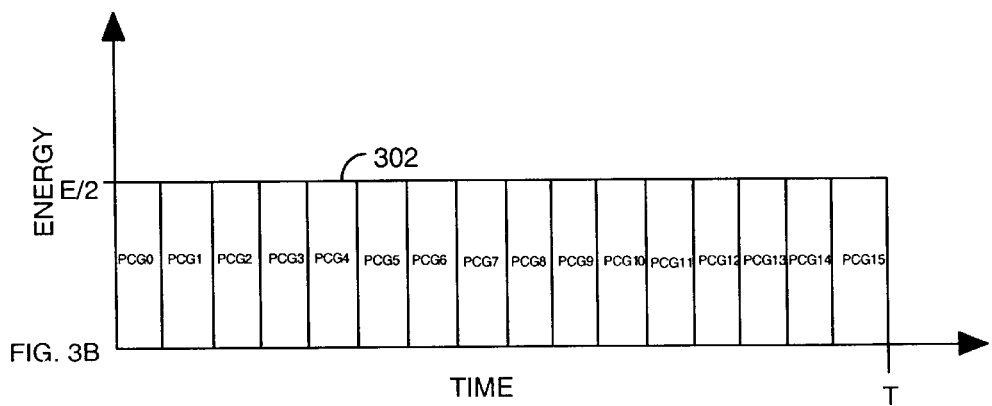
Figure 3C:
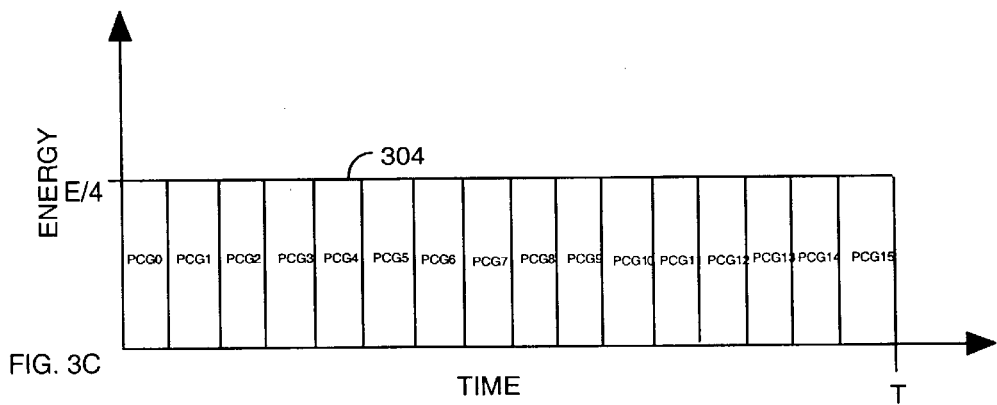

FIGS. 3A–3C illustrate the transmission energy versus time (in power control groups) for the three transmission rates-full, half, and quarter.

In FIG. 3A, for full rate frame 300, each power control group $PC_0$ through $PC_{15}$ is transmitted at energy E. For the sake, of simplicity the frames are illustrated as being transmitted at an equal energy for the duration of the frame. One skilled in the art will understand that the energy will vary over the frame and that what is represented in FIGS. 3A–3D can be thought of as the baseline energy at which the frames would be transmitted absent external effects. In the exemplary embodiment, remote station 50 responds to closed loop power control commands from the base station and from internally generated open loop power control commands based on the received forward link signal. The responses to the power control algorithms will cause the transmission energy to vary over the duration of a frame.

In FIG. 3B, for half rate frame 302, the energy is equal to half the predetermined maximum level, or E/2. This is represented in FIG. 3B. The interleaver structure is such that it distributes the repeated symbols over the frame in such a way to attain maximum time diversity.

In FIG. 3C for quarter-rate transmission 304, the frame is transmitted at approximately one-quarter of the predetermined maximum level, or E/4.

Figure 3D:
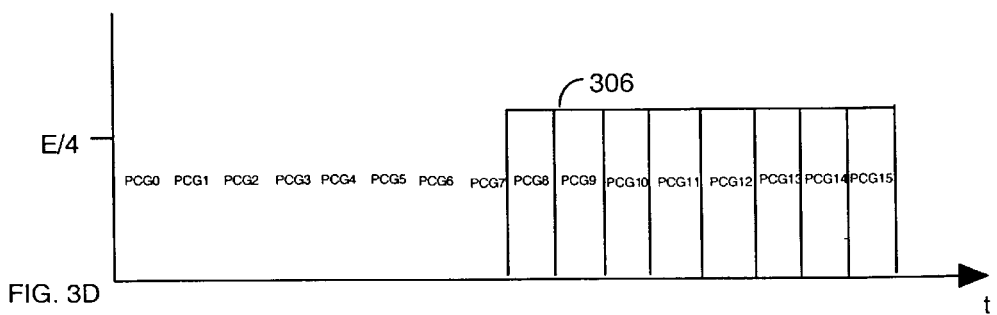

In the exemplary embodiment, during the transmission of full rate, half rate and quarter rate frames, the pilot signal is continuously transmitted. FIG. 3D illustrates eighth-rate transmission using a discontinuous transmission method. In FIG. 3D transmitter 28 gates the transmission of half of the frame. In the preferred embodiment, during the periods in which the traffic channel transmissions are gated off, the pilot channel is also gated off to reduce battery consumption and increase reverse link capacity. During eighth-rate transmissions, the frames are transmitted at a 50% duty cycle in which the transmission is gated off for half the transmit period. During the period in which the frame is transmitted, the energy is scaled to approximately the energy at which a quarter rate frame is transmitted E/4.

In the fourth embodiment, illustrated in FIG. 3D, the frame is transmitted such that it is gated off during the first 10 ms. In the next 10 ms the signal is transmitted. In this embodiment PCGs 8, 9, 10, 11, 12, 13, 14, 15 are transmitted, while PCGs 0, 1, 2, 3, 4, 5, 6, 7 are gated off. The interleaver structure is such that it discards exactly half of the repeated symbols during the gated off period in this embodiment. In this preferred embodiment the symbols are transmitted at an average or baseline energy of 0.335E.

Figure 2:
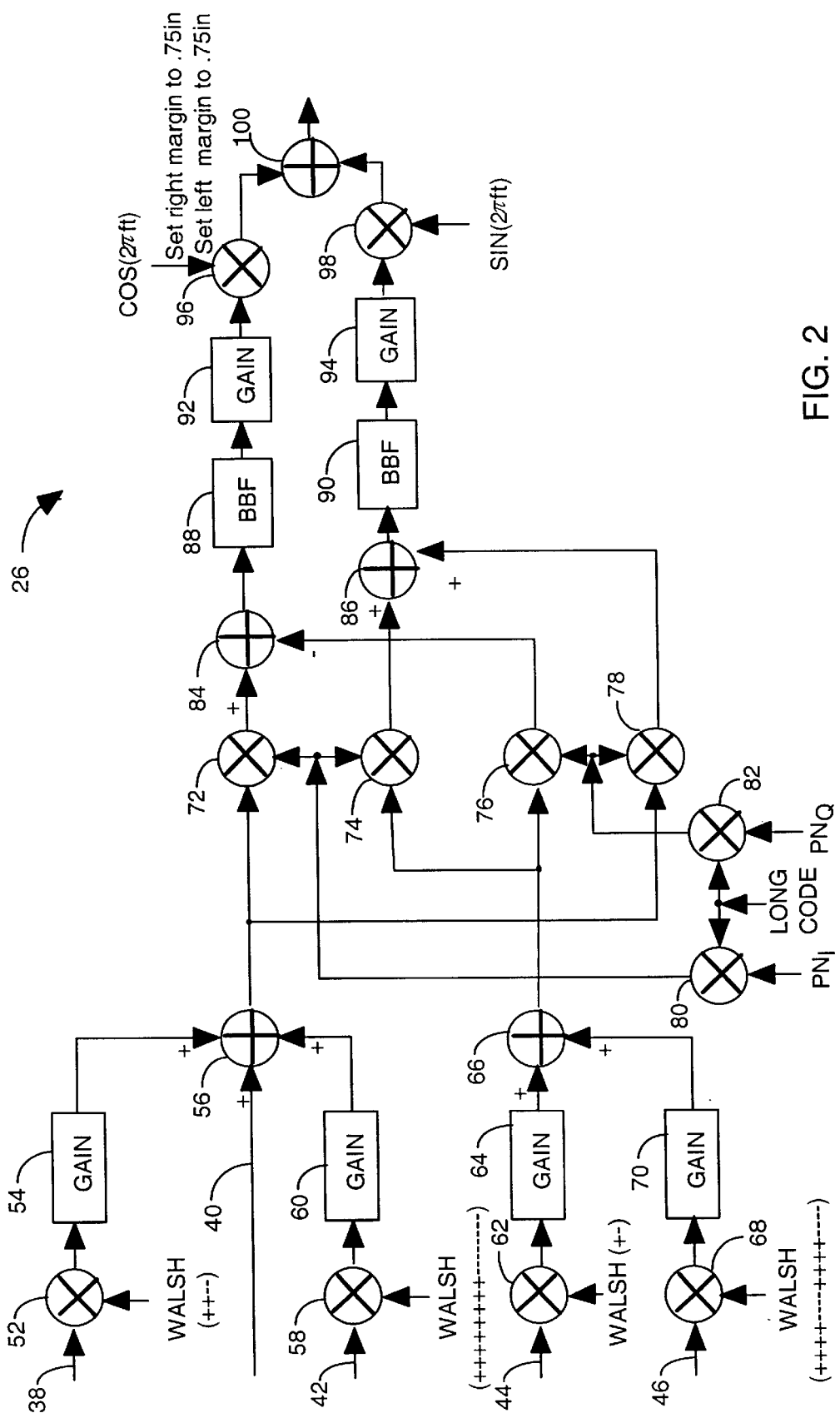
FIG. 2 is a functional block diagram of an exemplary embodiment of modulator 26 of FIG. 1.

FIG. 2 illustrates a functional block diagram of an exemplary embodiment of modulator 26 of FIG. 1. The first supplemental data channel data is provided on line 38 to spreading element 52 which covers the supplemental channel data in accordance with a predetermined spreading sequence. In the exemplary embodiment, spreading element 52 spreads the supplemental channel data with a short Walsh sequence (++−−). The spread data is provided to relative gain element 54 which adjusts the gain of the spread supplemental channel data relative to the energy of the pilot and power control symbols. The gain adjusted supplemental channel data is provided to a first summing input of summer 56. The pilot and power control multiplexed symbols are provided on line 40 to a second summing input of summing element 56.

Control channel data is provided on line 42 to spreading element 58 which covers the control channel data in accordance with a predetermined spreading sequence. In the exemplary embodiment, spreading element 58 spreads the control channel data with a short Walsh sequence (++++++++−−−−−−−−). The spread data is provided to relative gain element 60 which adjusts the gain of the spread control channel data relative to the energy of the pilot and power control symbols. The gain adjusted control data is provided to a third summing input of summer 56.

Summing element 56 sums the gain adjusted control data symbols, the gain adjusted supplemental channel symbols and the time multiplexed pilot and power control symbols and provides the sum to a first input of multiplier 72 and a first input of multiplier 78.

The second supplemental channel is provided on line 44 to spreading element 62 which covers the supplemental channel data in accordance with a predetermined spreading sequence. In the exemplary embodiment, spreading element 62 spreads the supplemental channel data with a short Walsh sequence (+−). The spread data is provided to relative gain element 64 which adjusts the gain of the spread supplemental channel data. The gain adjusted supplemental channel data is provided to a first summing input of summer 66.

The fundamental channel data is provided on line 46 to spreading element 68 which covers the fundamental channel data in accordance with a predetermined spreading sequence. In the exemplary embodiment, spreading element 68 spreads the fundamental channel data with a short Walsh sequence (++++−−−−++++−−−−). The spread data is provided to relative gain element 70 which adjusts the gain of the spread fundamental channel data. The gain adjusted fundamental channel data is provided to a second summing input of summer 66.

Summing element 66 sums the gain adjusted second supplemental channel data symbols and the fundamental channel data symbols and provides the sum to a first input of multiplier 74 and a first input of multiplier 76.

In the exemplary embodiment, a pseudonoise spreading using two different short PN sequences ($PN_I$ and $PN_Q$) is used to spread the data. In the exemplary embodiment the short PN sequences, $PN_I$ and $PN_Q$, are multiplied by a long PN code to provide additional privacy. The generation of pseudonoise sequences is well known in the art and is described in detail in aforementioned U.S. Pat. No. 5,103,459. A long PN sequence is provided to a first input of multipliers 80 and 82. The short PN sequence $PN_I$ is provided to a second input of multiplier 80 and the short PN sequence $PN_Q$ is provided to a second input of multiplier 82.

The resulting PN sequence from multiplier 80 is provided to respective second inputs of multipliers 72 and 74. The resulting PN sequence from multiplier 82 is provided to respective second inputs of multipliers 76 and 78. The product sequence from multiplier 72 is provided to the summing input of subtractor 84. The product sequence from multiplier 74 is provided to a first summing input of summer 86. The product sequence from multiplier 76 is provided to the subtracting input of subtractor 84. The product sequence from multiplier 78 is provided to a second summing input of summer 86.

The difference sequence from subtractor 84 is provided to baseband filter 88. Baseband filter 88 performs necessary filtering on the difference sequence and provides the filtered sequence to gain element 92. Gain element 92 adjusts the gain of the signal and provides the gain-adjusted signal to upconverter 96. Upconverter 96 upconverts the gain adjusted signal in accordance with a QPSK modulation format and provides the unconverted signal to a first input of summer 100.

The sum sequence from summer 86 is provided to baseband filter 90. Baseband filter 90 performs necessary filtering on difference sequence and provides the filtered sequence to gain element 94. Gain element 94 adjusts the gain of the signal and provides the gain-adjusted signal to upconverter 98. Upconverter 98 upconverts the gain adjusted signal in accordance with a QPSK modulation format and provides the upconverted signal to a second input of summer 100. Summer 100 sums the two QPSK modulated signals and provides the result to transmitter 28.

Figure 4:
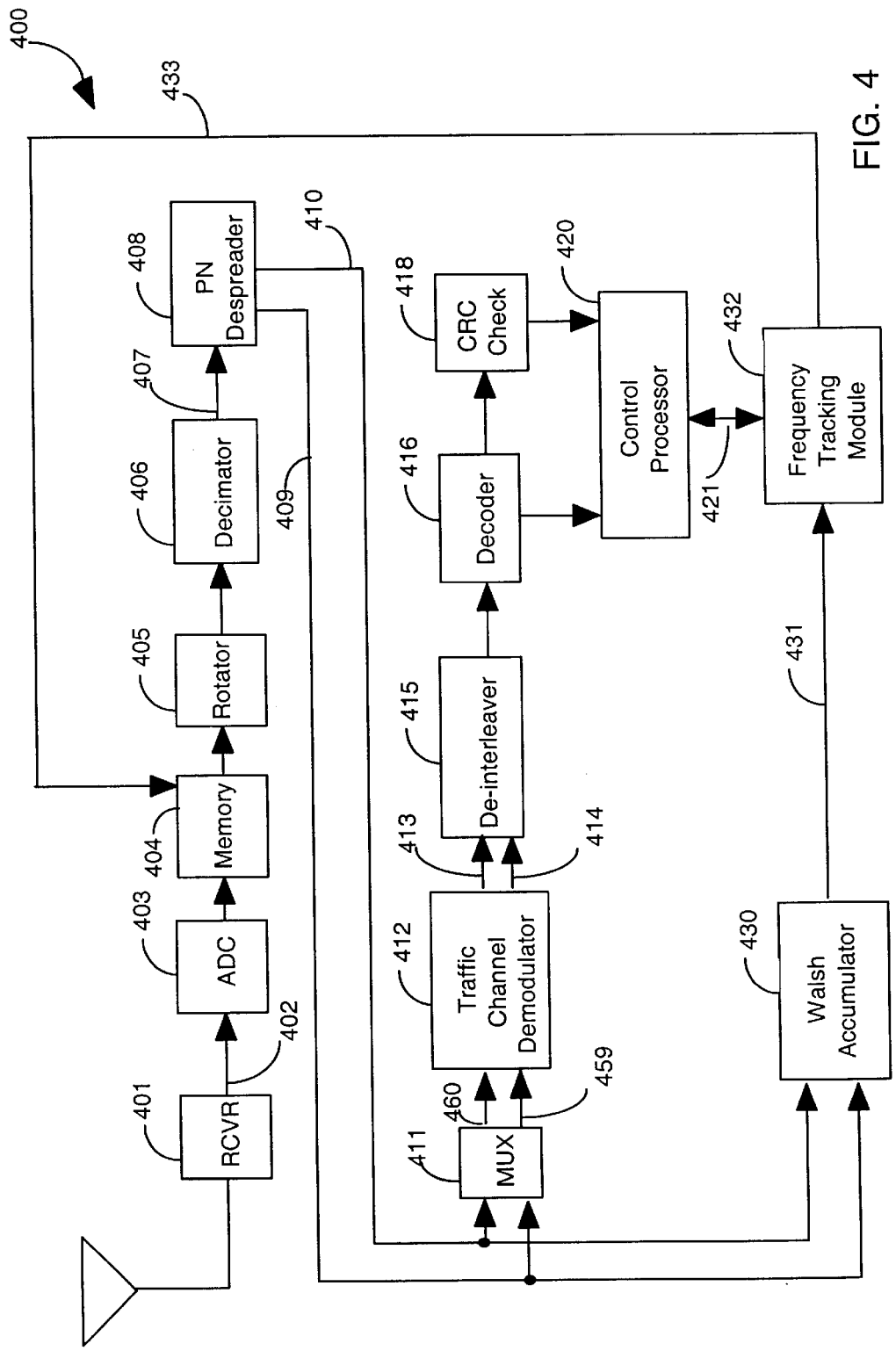
FIG. 4 is a functional block diagram of selected portions of a base station 400 in accordance with the present invention.

Turning now to FIG. 4, a functional block diagram of selected portions of a base station 400 in accordance with the present invention is shown. Reverse link RF signals from the wireless communication device 50 (FIG. 1) are received by receiver (RCVR) 401, which downconverts the received reverse link RF signals to an analog baseband frequency. In the exemplary embodiment, receiver 401 downconverts the received signal in accordance with a QPSK demodulation format. Analog to Digital Converter (ADC) 403 converts downcoverted signal 402 into digital baseband. The digital baseband signal is stored in memory 404. Memory 404 has the capacity to store a predetermined number of digital samples from ADC 403. Memory 404 further has the capacity to store two center frequency estimates from Frequency Tracking Module 432 further described with reference to FIG. 7. Memory 404 provides to rotator 405 a center frequency estimate to which to tune along with a predetermined number of digital samples from ADC 403. Whereas exemplary receiver 401 is either has a coarse tuning granularity (e.g. 1.25 MHz) or has a fixed tuning mechanism, exemplary rotator 405 is designed to fine-tune to a signal whose center is dynamically moving over a relatively smaller spectrum (e.g., 1–300 Hz). The sequence of digital samples is then subsampled by decimator 406 and a predetermined subset of the samples are output to PN Despreader 408. PN Despreader 408 despreads the decimated samples. PN Despreader 408 is further described with reference to FIG. 5 below. In the exemplary embodiment, PN despreader 408 is a complex PN despreader which outputs an in-phase (I) and a quadrature-phase (Q) component of the PN despreaded signal, 409 and 410 respectively.

The I and Q component outputs of PN despreader 408 are input to MUX multiplexer (MUX) 411. MUX 411 provides half of its PN despread symbols 409 and 410 to Traffic Channel Demodulator 412 in accordance with a predetermined algorithm. The PN despread symbols provided to Traffic Channel Demodulator 412 are labeled 459 and 460. Traffic Channel Demodulator 412, which demodulates the PN despread symbols to provide estimates of the transmitted traffic data is further described with reference to FIG. 6 below. De-interleaver 415 reorders demodulated traffic symbol estimates 413 and 414 in accordance with a predetermined de-interleaving format. The reordered symbols are provided to decoder 416 which decodes the symbols to provide an estimate of the transmitted frame. The estimate of the transmitted frame is then provided to CRC Check 418 which determines the accuracy of the frame estimate based on the CRC bits included in the transmitted frame. Control processor 420 uses inputs provided by decoder 416 and CRC Check 418 to determine the most likely rate at which the received frame was transmitted.

The output of PN Despreader 408 is also provided to Walsh accumulator 430. Frequency Tracking Module 432, further described with reference to FIG. 7 below, receives inputs from both Walsh accumulator 430 and control processor 420. In response to the inputs from Walsh accumulator 430 and control processor 420, frequency tracking module 432 provides memory 404 with a center frequency estimate to which to tune. As previously described, memory 404 provides said center frequency estimate along with a predetermined number of digital samples from ADC 403.

Figure 5:
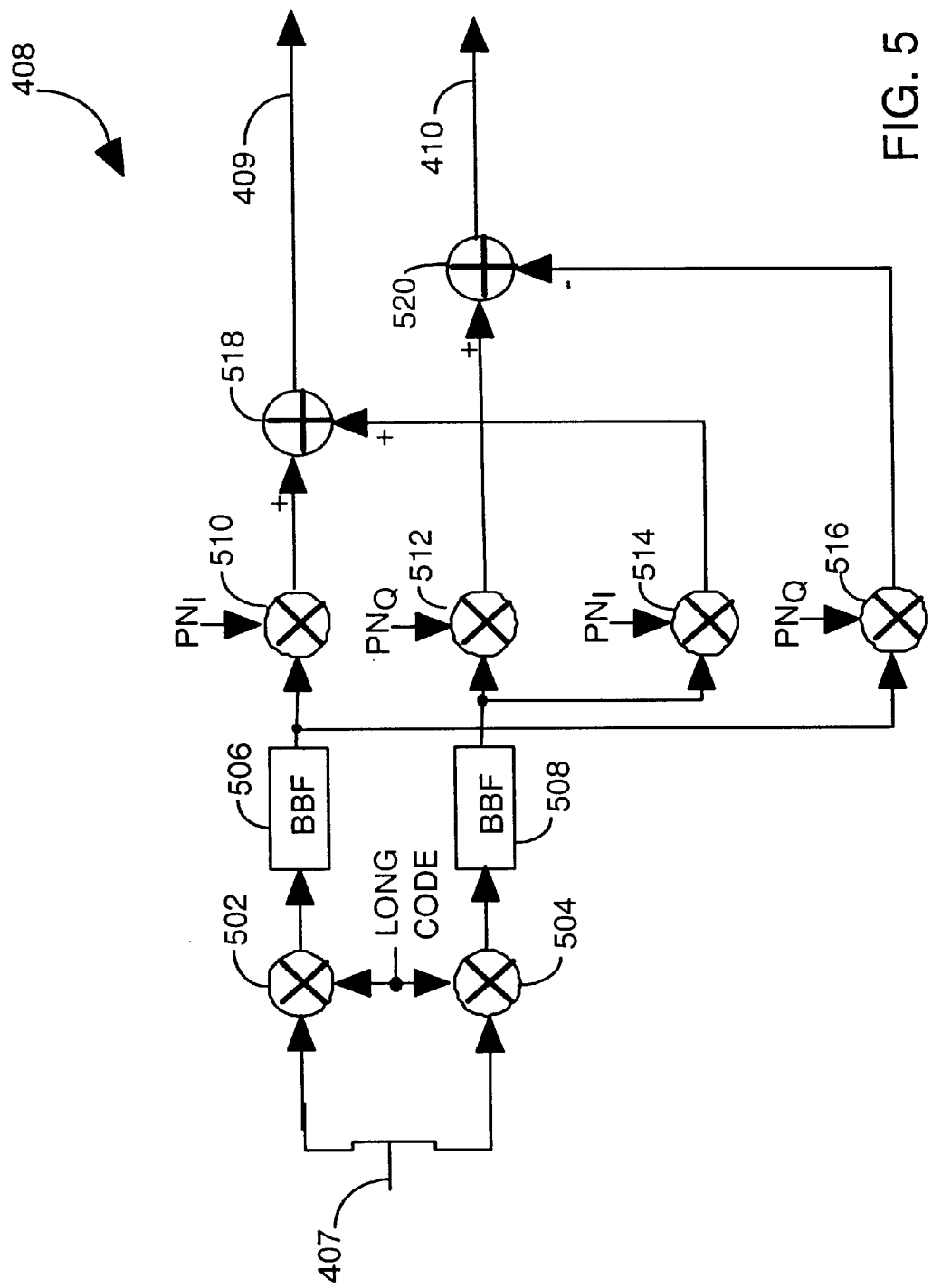
FIG. 5 is an expanded functional block diagram of an exemplary PN despreading chain 408 of FIG. 4.

FIG. 5 illustrates a functional block diagram of an exemplary embodiment of PN Despreader 408 of FIG. 4. As previously described, the exemplary PN Despreader 408 is a complex PN despreader which despreads decimated I & Q samples 407 and outputs both an in-phase (I) and a quadrature-phase (Q) component of the PN despreaded signal, 409 and 410 respectively.

Despreaders 502 and 504 respectively despread the I and Q baseband signals using the long code from FIG. 2. Baseband filters (BBF) 506 and 508 respectively filter the I and Q baseband signals. Despreaders 510 and 512 respectively despread the I and Q signals using the $PN_I$ sequence of FIG. 2. Similarly, despreaders 514 and 516 respectively despread the Q and I signals using the $PN_Q$ sequence of FIG. 2. The outputs of despreaders 510 and 512 are combined in combiner 518. The output of despreader 516 is subtracted from the output of despreader 512 in combiner 520. The PN despreaded in-phase (I) component 409 and quadrature-phase (Q) component 410 are output to MUX 411. In accordance with a predetermined algorithm, MUX 411 selectively provides to traffic channel demodulator 412 output lines 459 and 460 being identical to input lines 409 and 410.

Figure 6:
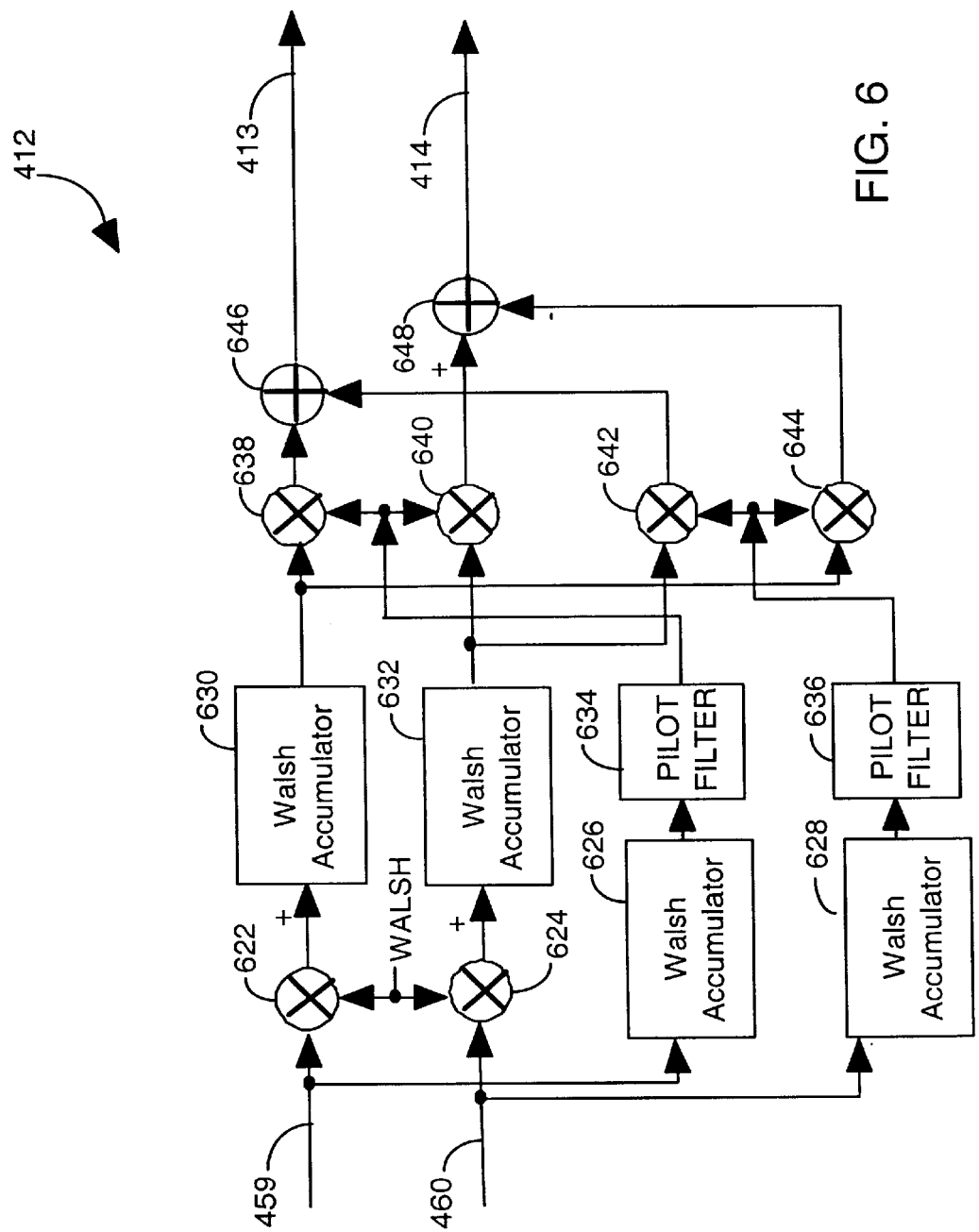
FIG. 6 is an expanded functional block diagram of an exemplary single traffic channel demodulation chain 412 of FIG. 4.

FIG. 6 illustrates a functional block diagram of an exemplary embodiment of Traffic Channel Demodulator 412 of FIG. 4. PN despreaded in-phase component 459 and quadrature-phase component 460 are provided by MUX 411 to Walsh-uncoverers 622 and 624 where they are Walsh-uncovered with the Walsh code that was used to cover the particular channel of interest in FIG. 2. The respective outputs of Walsh-uncoverers 622 and 624 are then summed over one Walsh symbol by Walsh accumulators 630 and 632.

PN despreaded in-phase component 459 and quadrature-phase component 460 are also summed over one Walsh symbol by Walsh accumulators 626 and 628. The respective outputs of Walsh accumulators 626 and 628 are then applied to pilot filters 634 and 636. Pilot filters 634 and 636 generate an estimation of the channel conditions by determining the estimated amplitude and phase of the pilot signal data 40 (see FIG. 1). The output of pilot filter 634 is then complex multiplied by the respective outputs of Walsh accumulators 630 and 632 in complex multipliers 638 and 640. Similarly, the output of pilot filter 636 is complex multiplied by the respective outputs of Walsh accumulators 630 and 632 in complex multipliers 642 and 644. The output of complex multiplier 642 is then summed with the output of complex multiplier 638 in combiner 646. The output of complex multiplier 644 is subtracted from the output of complex multiplier 640 in combiner 648. As previously described, demodulated traffic signals 413 and 414 are further processed by de-interleaver 415.

Figure 7:
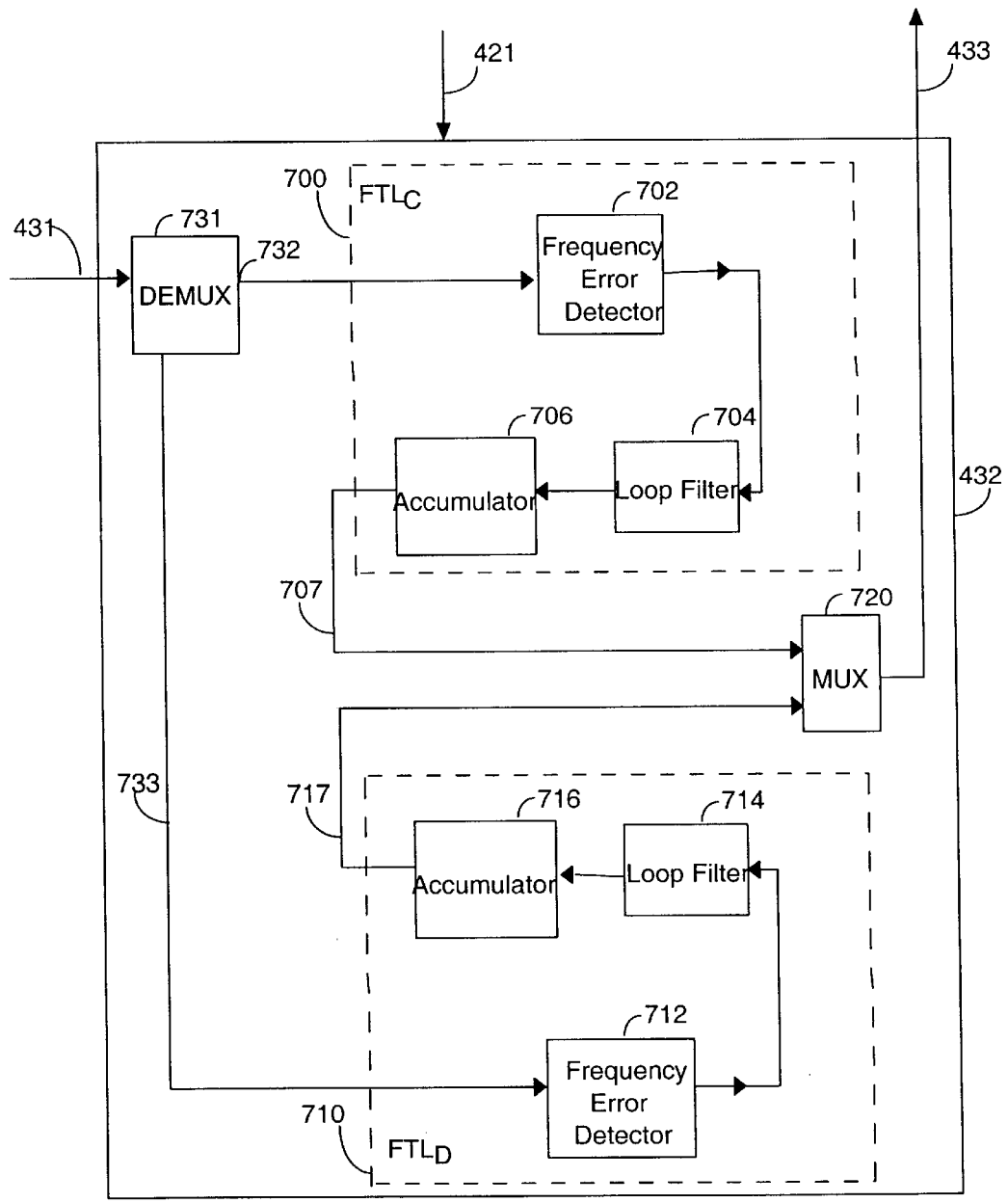
FIG. 7 is a block diagram of an exemplary frequency tracking module 432 of FIG. 4.

FIG. 7 illustrates a functional block diagram of an exemplary embodiment of frequency tracking module 432 of FIG. 4. In response to the inputs from Walsh accumulator 430 and control processor 420, frequency tracking module 432 provides memory 404 with center frequency estimate 433. Memory 404 subsequently provides to rotator 404 the estimated frequency to which to tune. Frequency tracking module 432 consists of two frequency tracking loops, $FTL_C$ and $FTL_D$, each having a specialized tracking function. In the exemplary embodiment, $FTL_C$ 700 performs its tracking operation based on the hypothesis that the received pilot is continuous throughout the frame's duration. In the exemplary embodiment, $FTL_D$ 710 performs its tracking operation based on the hypothesis that the received pilot is discontinuous and is only present for a portion of the frame's duration.

Output 431 from Walsh accumulator 430 is provided to demultiplexer (DEMUX) 731. DEMUX 731 is a demultiplexer which can be switched in one of two positions. In the first position, output 732 is identical to input 431. In the second position, output 733 is identical to input 431.

In the exemplary embodiment, when frequency tracking module 732 is tracking frequency based on the hypothesis that the received pilot is continuous throughout the frame's duration, DEMUX 731 provides input from Walsh accumulator 430 to $FTL_C$ 700 on line 732. In $FTL_C$ 700, Frequency Error Detector 702 receives input from Walsh accumulator 430 via DEMUX 731. Frequency Error Detector 702 samples this input and estimates the true center of frequency relative to the frequency at which rotator 404 is currently tuned. In the exemplary embodiment of frequency tracking module 432, the estimated center of frequency is provided as input to Loop Filter 704. In embodiments in which minimal latency is desired, the output of Frequency Error Detector 702 can be provided directly to Accumulator 706. Loop Filter 704 is a loop filter as is well known in the art and is described in detail in *Phaselock Technique*, $2^{nd}$ ed., F. M. Gardner, John Wiley & Sons, Inc., New York, 1979, and incorporated by reference herein. In the exemplary embodiment, Loop Filter 704 stores the output of Frequency Error Detector 702 in a memory storage area. Loop Filter 704 adjusts the estimate of the center of frequency based upon previous estimates stored in its memory area. Loop Filter 704 provides Accumulator 706 with its adjusted estimate of the center of frequency. Accumulator 706 outputs to MUX 720 a smoothed estimate of the center of frequency to which to tune. MUX 720 is a multiplexer which can be switched in one of two positions. In the first position, output 433 is identical to input 707. In the second position, output 433 is identical to input 717.

In the exemplary embodiment, when frequency tracking module 732 is tracking frequency based on the hypothesis that the received pilot is continuous throughout the frame's duration, DEMUX 731 provides input from Walsh accumulator 430 to $FTL_D$ 710 on line 733. In the exemplary embodiment of $FTL_D$ 710, Frequency Error Detector 712 receives input from Walsh accumulator 430 via DEMUX 731. Frequency Error Detector 712 samples this input and estimates the true center of frequency relative to the frequency at which rotator 404 is currently tuned. In the exemplary embodiment of frequency tracking module 432, the estimated center of frequency is provided as input to Loop Filter 714. In embodiments in which minimal latency is desired, the output of Frequency Error Detector 712 can be provided directly to Accumulator 716.

Loop Filter 714 is a loop filter as is well known in the art and is described in detail in *Phaselock Technique, 2$^{nd}$ ed.*, F. M. Gardner, John Wiley & Sons, Inc., New York, 1979. In the exemplary embodiment, Loop Filter 714 stores the output of Frequency Error Detector 712 in a memory storage area. Loop Filter 714 adjusts the estimate of the center of frequency based upon previous estimates stored in its memory area. Loop Filter 714 provides Accumulator 716 with its adjusted estimate of the center of frequency. Accumulator 716 outputs to MUX 720 a smoothed estimate of the center of frequency to which to tune.

Whereas $FTL_C$ 700 provides frequency estimate updates by continuously sampling Walsh accumulator output 431, exemplary $FTL_D$ 710 performs frequency estimate updates by sampling Walsh accumulator output 431 during the latter half of the 20 ms frame boundary. This is done because $FTL_D$ 710 performs frequency tracking based on the hypothesis that the incoming frame is an eighth rate frame in which the pilot signal is only present during the latter half of the fundamental traffic channel frame.

In the exemplary embodiment of frequency tracking module 432, accumulators 706 and 708 and loop filters 704 and 714 have memory contents stored in registers which are can be both read and written to by Control Processor 432.

Figure 8:
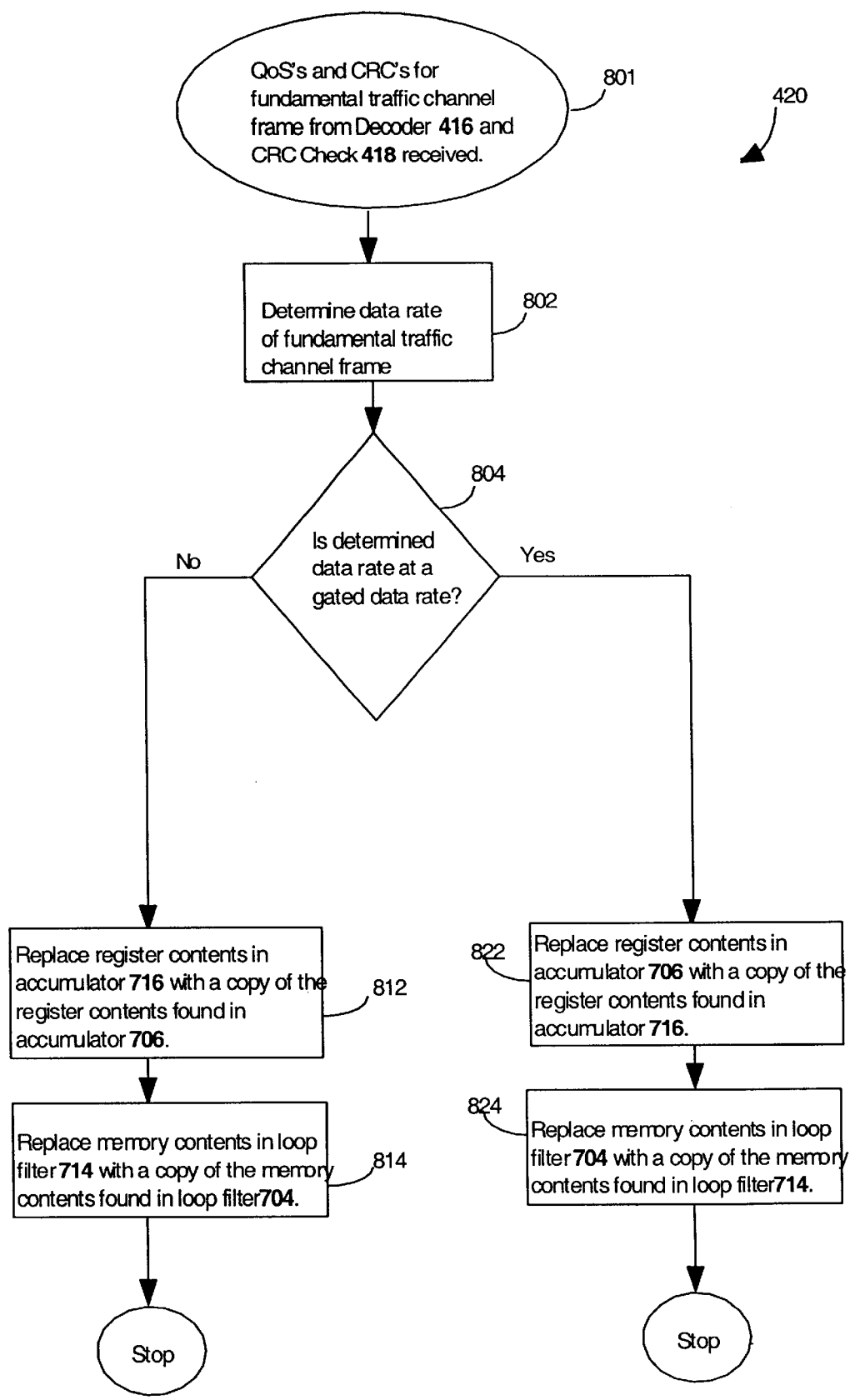
FIG. 8 is a flowchart describing the frequency tracking operation of the present invention.

The methodology utilized by control processor 420 provides the means for frequency tracking module 432 to output to rotator 404 an accurate estimate of the frequency to which to tune. FIG. 8 illustrates a flow chart of the methodology used by control processor 420 each time decoder 416 and CRC Check 418 process an incoming fundamental traffic frame.

The methodology utilized by control processor 420 which is illustrated in FIG. 8 begins in block 801. For each received fundamental traffic channel frame, decoder 416 and CRC Check 418 provide information to control processor 420 to determine the rate of the received fundamental frame. As illustrated in block 801, each time control processor 420 receives the quality of signal (QoS) metrics and CRCs for the current fundamental traffic channel frame from Decoder 416 and CRC Check 418, the process moves to block 802. As illustrated in block 802, control processor 420 utilizes an algorithm to determine the most likely data rate of the frame. Methods for performing rate determination in a variable rate communication system are well known in the art. An exemplary method for performing rate determination is described in U.S. Pat. Nos. 5,774,496 and 5,566,206 entitled "METHOD AND APPARATUS FOR DETERMINING DATA RATE OF TRANSMITTED VARIABLE RATE DATA IN A COMMUNICATIONS RECEIVER" and U.S. Pat. No. 5,710,784 entitled "MULTIRATE SERIAL VITERBI DECODER FOR CDMA SYSTEM APPLICATIONS", all of which are assigned to the assignee of the present invention and incorporated by reference herein.

Once control processor 420 determines the data rate of the frame, the process moves to block 804. As illustrated in block 804, control processor 420 checks whether the determined data rate is that of a gated data rate. In the exemplary embodiment, control processor 420 determines whether the received frame is an eighth rate frame. If the determined data rate is not of a gated data rate, the process moves to block 812. Otherwise, if the determined data rate is of a gated data rate, the process moves to block 822.

When the data rate is not of a gated data rate, control processor 420 utilizes the information in continuous frequency tracking loop $FTL_C$ 700 to accurately track the center of the received frequency. As illustrated in blocks 812 and 814, control processor 420 sets the values in discontinuous frequency tracking loop $FTL_D$ 710 to those in continuous frequency tracking loop $FTL_C$ 700. Exemplary control processor 420 does this by replacing the register contents in accumulator 716 with a copy of the register contents found in accumulator 706 (illustrated in block 812), and by replacing the memory contents in loop filter 714 with a copy of the memory contents found in loop filter 704 (illustrated in block 814).

When the data rate is of a gated data rate, control processor 420 utilizes the information in discontinuous frequency tracking loop $FTL_D$ 710 to accurately track the center of the received frequency. As illustrated in blocks 822 and 824, control processor 420 sets the values in continuous frequency tracking loop $FTL_C$ 700 to those in discontinuous frequency tracking loop $FTL_D$ 710. Exemplary control processor 420 does this by replacing the register contents in accumulator 706 with a copy of the register contents found in accumulator 716 (illustrated in block 822), and by replacing the memory contents in loop filter 704 with a copy of the memory contents found in loop filter 714 (illustrated in block 824).

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus comprising:
   a processor to determine a data rate of a received frame based on an estimate of the received frame and an accuracy check of the received frame; and
   a frequency tracking module coupled to the processor to track frequency of received data in the received frame, the frequency tracking module comprising a first frequency tracking loop and a second frequency tracking loop,
   wherein the processor utilizes information provided by the first frequency tracking loop to track a center frequency of the received data if the determined data rate is not at a gated data rate, and wherein the processor utilizes information provided by the second frequency tracking loop to track the center frequency of the received data if the determined data rate is at the gated data rate.

2. The apparatus of claim 1 wherein the first frequency tracking loop tracks frequency of the received data based on a first hypothesis that a received pilot signal is continuous throughout the received frame's duration and wherein the second frequency tracking loop tracks frequency of the received data based on a second hypothesis that the received pilot signal is present only in a portion of the received frame.

3. The apparatus of claim 2 further comprising:
   a memory coupled to store estimates of the center frequency generated by the frequency tracking module.

4. The apparatus of claim 1 further comprising:

a decoder to provide the estimate of the received frame; and a Cyclic Redundancy Check (CRC) unit to received the estimate of the receive frame from the decoder and to perform the accuracy check on the received frame based on CRC bits included in the received frame.

5. The apparatus of claim 1 wherein the gated data rate corresponds to an eighth rate.

6. The apparatus of claim 2 wherein the control processor replaces estimates generated by the second frequency tracking loop by estimates generated by the first frequency tracking loop when the determined data rate is not at the gated data rate.

7. The apparatus of claim 2 wherein the control processor replaces estimates generated by the first frequency tracking loop by estimates generated by the second frequency tracking loop when the determined data rate is at the gated data rate.

8. The apparatus of claim 2 wherein the first frequency tracking loop comprises:

a first frequency detector to receive a despread reference signal and to estimate the center frequency of the received data in accordance with the reference signal; and a first accumulator to accumulate estimates of the center frequency generated by the first frequency detector.

9. The apparatus of claim 8 further comprising:

a first loop filter coupled to the first frequency detector and the first accumulator, the first loop filter to filter the estimate of the center frequency generated by the first frequency detector and to provide an adjusted estimate of the center frequency to the first accumulator.

10. The apparatus of claim 2 wherein the second frequency tracking loop comprises:

a second frequency detector to receive a despread reference signal and to estimate the center frequency of the received data in accordance with the reference signal; and a second accumulator to accumulate estimates of the center frequency generated by the second frequency detector.

11. The apparatus of claim 10 further comprising:

a second loop filter coupled to the second frequency detector and the second accumulator, the second loop filter to filter the estimate of the center frequency generated by the second frequency detector and to provide an adjusted estimate of the center frequency to the second accumulator.

12. A method comprising:

determining a data rate of a received frame based on an estimate of the received frame and an accuracy check of the received frame;

determining whether the data rate of the received frame is at a gated data rate; and tracking a center frequency of received data depending on whether the data rate of the received frame is at the gated data rate, based on estimates of the center frequency generated by a frequency tracking module comprising a first frequency tracking loop and a second frequency tracking loop.

13. The method of claim 12 wherein adjusting comprises:

tracking the frequency of the received data based on a first hypothesis that a received pilot signal is continuous throughout the received frame's duration; and tracking the frequency of the received data based on a second hypothesis that the received pilot signal is present only in a portion of the received frame.

14. The method of claim 12 further comprising:

storing estimates of the center frequency generated by the frequency tracking module.

15. The apparatus of claim 11 further comprising:

decoding the received frame to provide the estimate of the received frame; and performing a Cyclic Redundancy Check (CRC) check to verify accuracy of the received frame based on CRC bits included in the received frame.

16. The method of claim 12 wherein the gated data rate corresponds to an eighth rate.

17. The method of claim 13 wherein adjusting comprises:

replacing estimates generated by the second frequency tracking loop by estimates generated by the first frequency tracking loop when the determined data rate is not at the gated data rate.

18. The method of claim 13 wherein adjusting comprises:

replacing estimates generated by the first frequency tracking loop by estimates generated by the second frequency tracking loop when the determined data rate is at the gated data rate.

19. The method of claim 13 wherein tracking the frequency of the received data based on the first hypothesis comprises:

receiving a despread reference signal;

estimating the center frequency of the received data in accordance with the reference signal;

filtering the estimate of the center frequency to generate an adjusted estimate of the center frequency; and accumulating estimates of the center frequency.

20. The method of claim 13 wherein tracking the frequency of the received data based on the second hypothesis comprises:

receiving a despread reference signal;

estimating the center frequency of the received data in accordance with the reference signal;

filtering the estimate of the center frequency to generate an adjusted estimate of the center frequency; and accumulating estimates of the center frequency.

* * * * *